United States Patent [19]
Ballard

[11] Patent Number: 4,611,669
[45] Date of Patent: Sep. 16, 1986

[54] TINE ASSEMBLY
[75] Inventor: Louis F. Ballard, Medina, Ohio
[73] Assignee: MTD Products Inc., Cleveland, Ohio
[21] Appl. No.: 594,343
[22] Filed: Mar. 29, 1984
[51] Int. Cl.⁴ .............................................. A01B 33/14
[52] U.S. Cl. ...................................... 172/545; 172/42;
  172/91; 172/556; 241/194; 403/116; 403/120;
  403/408.1
[58] Field of Search .................... 172/42, 43, 545, 546,
  172/556, 540, 45, 548, 91, 96, 123, 549, 550,
  544; 56/294; 37/189, 190; 301/45; 403/116,
  117, 120, 408.1; 241/193, 194, 277, 286–288

[56]  References Cited
  U.S. PATENT DOCUMENTS

| 1,500,502 | 7/1924 | Kuhn | 56/294 |
| 3,060,706 | 10/1962 | Hess | 403/120 X |
| 3,309,854 | 3/1967 | Mitchell | 56/294 X |
| 3,557,880 | 1/1971 | van der Lely | 172/91 |
| 3,952,811 | 4/1976 | Carre | 172/45 |
| 4,338,771 | 7/1982 | Hummel | 56/294 |
| 4,492,271 | 1/1985 | Doering | 172/43 |
| 4,556,113 | 12/1985 | Saito et al. | 172/91 |

FOREIGN PATENT DOCUMENTS

| 626954 | 9/1961 | Canada | 56/294 |
| 7424037 | 4/1975 | France | 56/294 |
| 505180 | 5/1939 | United Kingdom | 172/550 |
| 790829 | 2/1958 | United Kingdom | 172/544 |

Primary Examiner—Richard J. Johnson
Assistant Examiner—Terrence L. B. Brown
Attorney, Agent, or Firm—Woodling, Krost and Rust

[57]  ABSTRACT

A tine assembly for a tiller, comprising a plate (12 or 20) mounted on a rotative shaft (11) and a plurality of tines (13 or 21) connected by a pivotal connection (14 or 22) to the plate so as to swing outwardly of the plate to engage the soil upon rotation of the plate, and limiting means comprising bolts (15 or 24) in arcuate slots (13D or 23) whereby the tines are angled or positioned for proper soil working action depending on the rotative direction of the plate with the shaft.

16 Claims, 4 Drawing Figures ured Jan. 9, 1979 to Leonard V. Reaume.

TINE ASSEMBLY

FIELD TO WHICH INVENTION RELATES

My invention relates to tine assemblies for tillers such as powered garden tillers having tines in the general form of bent blades revolved around to cut into and disturb the soil along which the tiller is moved

BACKGROUND ART OF THE INVENTION

An example of a typical tiller of such general structure is shown and described in U.S. Pat. No. 4,133,390 issued Jan. 9, 1979 to Leonard V. Reaume.

Such tillers incorporate a transversely mounted shaft which is rotated on its axis by power derived from an engine or motor mounted on the chassis of the tiller. Tine assemblies are mounted on the shaft so that the tines revolve around the axis of the shaft with the tines extending radially outward of the axis of the shaft as seen in said U.S. Pat. No. 4,133,390. Usually the tines of each tine assembly are mounted on a plate, disc or hub secured to the shaft whereby the tines revolve around the axis of the shaft as the plate, disc or hub rotates with the shaft.

Usually, it is desired to operate a tiller in a forward direction. Upon the driving mechanism of the tiller being properly adjusted by the operator of the tiller to control the rotation of the shaft, the tines will revolve and dig into and engage the soil in such an angle and in such a manner that the tines pull or propel the tiller in a forward direction, that is in a direction away from the operator standing in the back near the rearwardly extending handles.

At other times the operator may alternately desire to operate the tiller in a rearward direction. Upon the driving mechanism being properly adjusted by the operator of the tiller to control the rotation of the shaft, the tines will revolve and dig into and engage the soil at such an angle and in such a manner that the tines pull or propel the tiller in a rearward direction, that is in a direction toward the operator standing in the back near the rearwardly extending handles.

My improved tine assembly is of the general nature and class as shown in U.S. Pat. No. 3,151,685 issued Oct. 6, 1964 to Frank H. Field, but is different from the tine assembly of that patent in several respects as will become apparent from the present description.

STATEMENT OF THE INVENTION

It is an object of my invention to provide a tine assembly so constructed and arranged that the tines automatically assume the correct angle and posture for engaging the soil to propel the tiller in a forward direction upon the tiller shaft being rotated in a forward driving direction, and that the tines automatically assume the correct angle and posture for engaging the soil to propel the tiller in a rearward direction upon the tiller shaft being rotated in a rearward driving direction.

Another object of my invention is to assure that the tines of a tine assembly will automatically and without manual intervention be positioned or extended correctly to provide for propelling the tiller in the proper direction to correspond with the rotative direction of the tiller shaft upon which the tine assembly is mounted.

Another object is to provide that the soil-cutting edge portion of a pair of opposed soil-cutting edges on a tine of a tine assembly required for soil cutting in the then rotative direction of the tine assembly is properly directed for such soil cutting.

Other objects and advantages may be observed from the following description of the invention in conjunction with the several drawings.

FIGURES OF THE DRAWINGS

DESCRIPTION OF THE INVENTION HEREIN DISCLOSED

Figure 1:
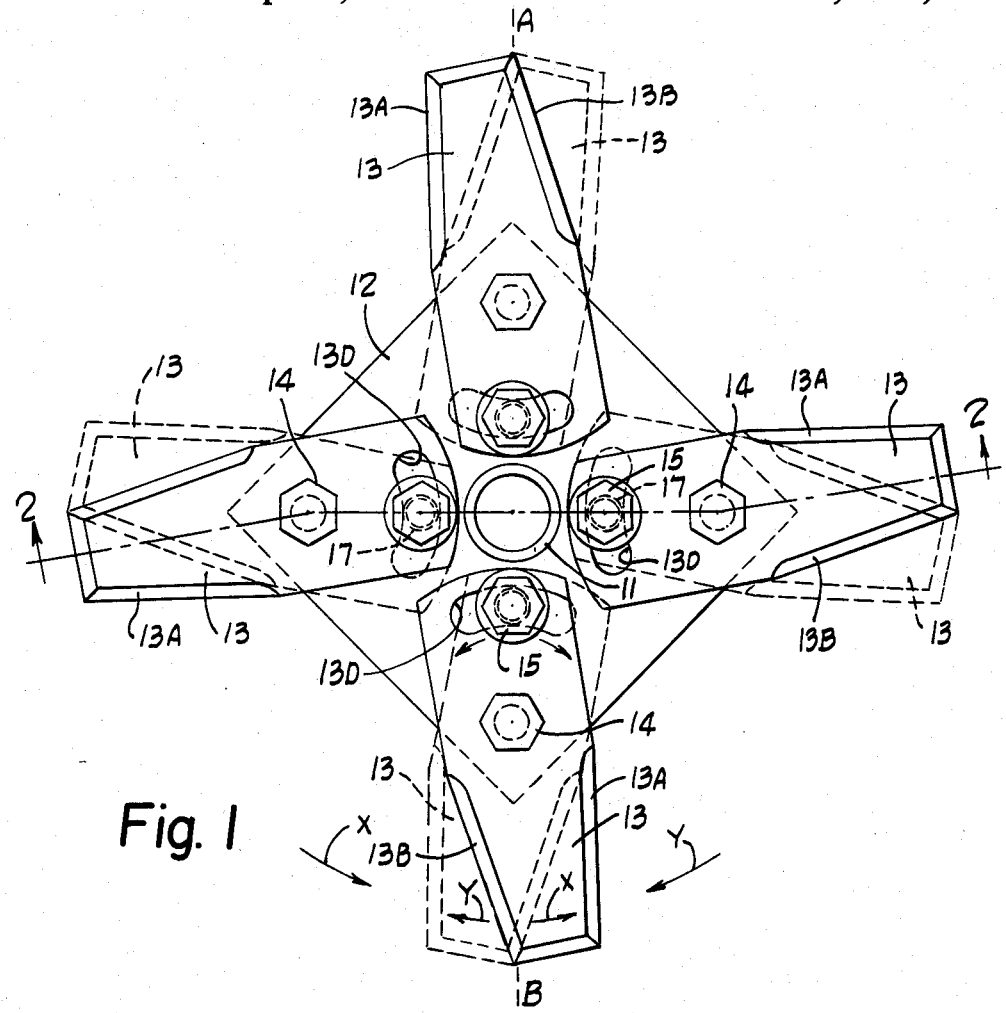
FIG. 1 is a view looking at my tine assembly from a side of the tiller upon which the assembly is mounted and shows the tine assembly mounted on the end of the tiller shaft which carries the tine assemblies.

A typical tiller for which my improved tine assembly may be adapted is shown in U.S. Pat. No. 4,133,390 issued Jan. 9, 1979 to Leonard V. Reaume, and U.S. Pat. No. 3,180,428 issued Apr. 22, 1965 to Albert R. Price. My tine assembly, however, is sharply distinguishable from the tine assemblies shown mounted on the tiller in those prior patents.

In the preferred form of my improved tine assembly there is a plate 12 (which may be square or any other suitable shape) which plate is welded to the tine-driving shaft 11 of a tiller so as to rotate with the shaft. There may be a plurality of tine assemblies mounted on the shaft. An assembly may be mounted on the outboard ends of the shaft and other tine assemblies may be mounted intermediate of the two outboard assemblies. Examples of such arrangements of tine assemblies on a tiller shaft are illustrated in said U.S. Pat. No. 4,133,390 issued to Reaume.

The assembly preferably has four tines 13 pivotally mounted by pivot bolts 14 to the plate 12, which is welded at the central portion of the plate 12 to the end portion of shaft 11 so that both rotate together upon the shaft being rotated by the tiller engine drive (not shown). The plate 12 rotates in the same rotational direction, that is forwardly or rearwardly, as is the rotational direction of shaft 11.

Each pivot connection of a tine 13 to plate 12 is made by a bolt 14 extending through a hole 13C in the respective tine 13 and through a corresponding hole 12C in plate 12 aligned with hole 13C, and the bolt 14 secured in place by a nut 14A. The fit of the shank of the bolt 14 in hole 13C is such that each tine 13 is so pivotally connected with plate 12 that the tine may readily swing outward by centrifugal force upon rotation of plate 12 with shaft 11.

Each tine 13 has formed in its end closest to the axis of shaft 11 an arcuate slot 13D. The curve or arc of each slot 13D is generated around the axis of the pivot connection 14 pivotally mounting that tine to the plate.

Each tine at its outer end portion is bent or curved outwardly in the usual manner to provide soil-working outer end portions. These soil-working portions have extending along both of their opposite longitudinal edges beveled portions 13A and 13B. These edge portions 13A and 13B form "knives" which cut into and disturb the soil upon the assembly being rotated so as to "throw out" the tines, by centrifugal force, into engagement with the soil.

The degree of swinging of the tines on their respective pivot connections is determined by four bolts 15 each in an arcuate slot 13D. The bolt 15 may slide back and forth in a slot to the limits provided by the ends of the slot in which positioned. The bolts extend through holes 12D in the plate 12 and are secured in place by nuts 15A.

To provide some frictional drag to prevent unrestrained or wild swinging of the tines on their respective pivot connections, bellows washers 16 are mounted between the heads of bolts 15 and the surface of plate 12. To facilitate the movement of the shanks of bolts 15 in the arcuate slots, annular rollers 17 are mounted on the shanks of bolts 15 in the respective slots.

Whether the tines 13 as they swing outwardly upon rotation of the shaft 11 assume the positions shown in full lines or assume the positions shown in broken lines in FIG. 1 depends upon the rotative direction of the tine assembly upon being rotated. Upon the tine assembly being rotated, the tines are swung outwardly to engage the soil below the tiller. Upon the soil working end portion of a tine engaging the soil there is resistance provided by the soil to further swinging of the tine. This resistance provided by the soil causes the tine to "lag". In this "lagged" position of the tines they extend at an angle to reference lines A-B drawn through the axis of shaft 11 and the axis of the pivot connection 14 of the respective tine 13.

Upon the tine assembly shown in FIG. 1 being rotated in a clockwise direction, the tine will be urged by the soil encountered by the tines to assume their postures shown in full lines. In this posture of the tines swung at an angle to reference lines A-B, the beveled cutting edge 13B of each tine meets, and cuts into, the soil for cutting clods of soil. The other or opposite cutting edge 13A of the tine trails behind and provides clearance in this cutting action by rotation of the tine assembly.

Upon the tine assembly being rotated in an opposite direction, that is in a counter-clockwise direction, then the tines upon meeting the resistance of the soil are swung to, and assume, the positions shown in broken lines in FIG. 1. In these positions, at an angle to respective reference lines A-B, shown in broken lines, the beveled cutting edge 13A of each tine meets, and cuts into the soil for cutting clods of soil. The other or opposite cutting edge 13B trails behind and provides clearance in the cutting action.

It may be noted that at the extreme outer end of each tine there is an end cutting edge extending transversely across between the opposite longitudinal edge portions 13A and 13B. These leave a corner at the junctions of the end cutting edge with each of the longitudinal edge portions. One of these corners leads and cuts into the soil along with the respective longitudinal edge portion. The end cutting edge extends back at an angle to provide a trailing clearance for the leading corner.

By means of structure and arrangement of my tine assembly, the tines are automatically placed in proper and efficient postures for soil tilling operation both when the tillers is operated to provide forward movement and when the tiller is operated to provide rearward movement.

Figure 4:
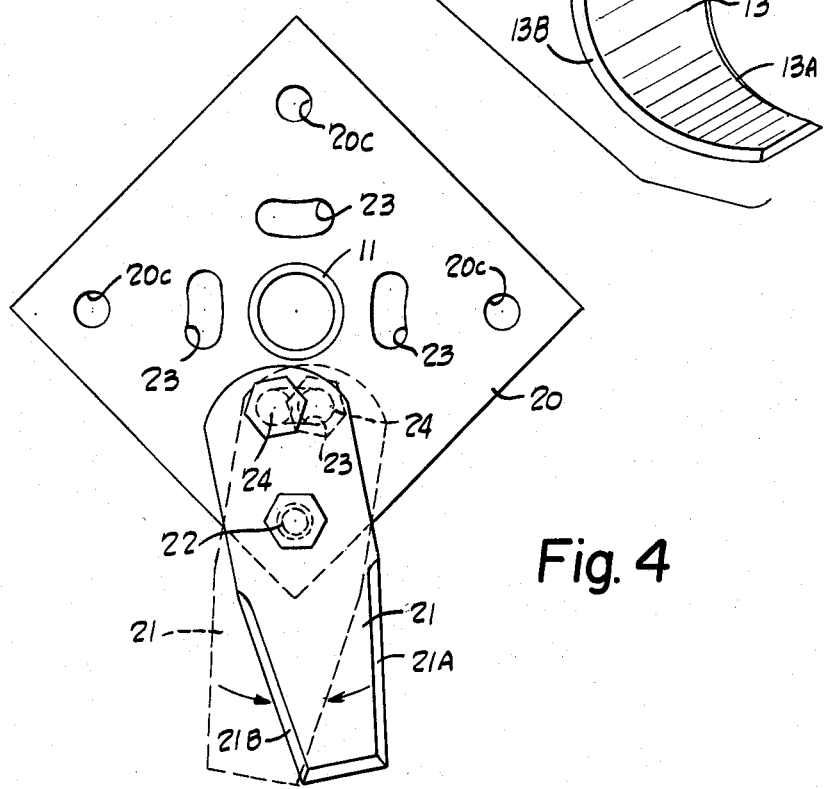
FIG. 4 is a view of a modified form of my improved tine assembly and showing but one tine of the four tines mounted on the plate of the assembly as are four tines included in the assembly of FIGS. 1 and 2.

In FIG. 4 there is illustrated a modified form of my improved tine assembly. In this modified form of tine assembly, the tines 21 are pivotally mounted by four bolts 22 extending through four holes 20C in plate 20.

Figure 2:
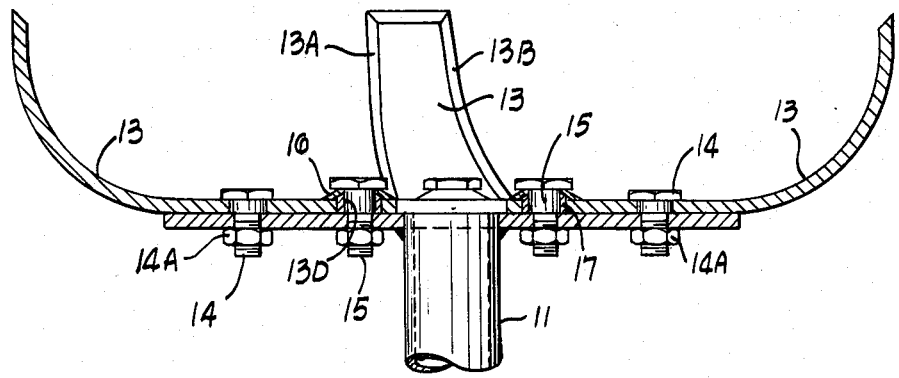
FIG. 2 is a view partially in section showing a cross view through the line, and looking in the direction of the arrows, 2—2 of FIG. 1.
Figure 3:
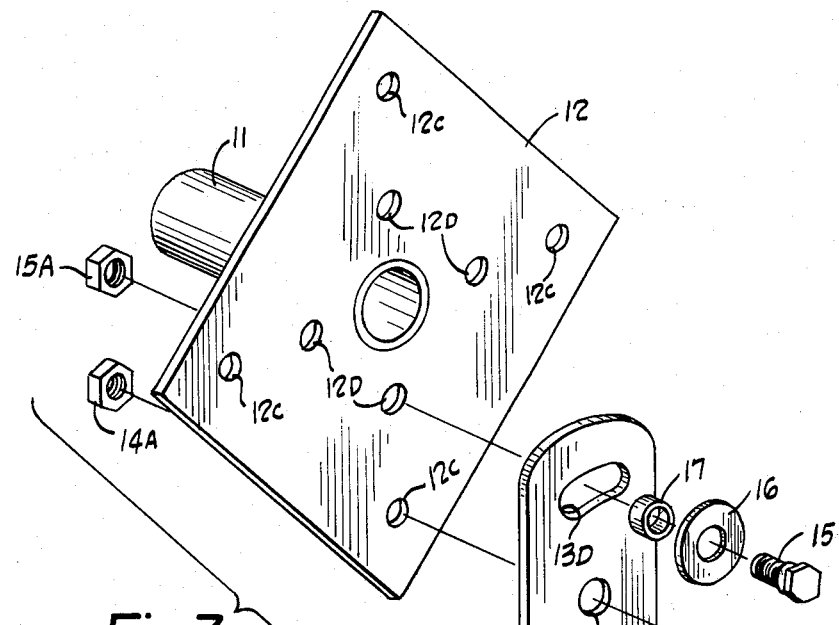
FIG. 3 is an exploded view showing one of the tines and the mounting plate, with the end portion of the shaft upon which carried, illustrated in FIGS. 1 and 2.

Although there are four tines 21 mounted to plate 20, only one is illustrated, for purposes of simplicity. Instead of having the arcuate slots disposed in the tines, as in the preferred form of FIGS. 1 to 3, in the modified form of FIG. 4 the arcuate slots 23 are formed in the plate 20 and a bolt 24 carried by each tine 21 is slidable along in the arcuate slot 23 so as to control and limit the swinging of the tines on their respective pivot connections.

Each tine 21 has opposite longitudinal beveled edge portions 21A and 21B which alternately meet and cut into the soil depending on the rotative direction of the assembly. The operation and result obtained from the modified form of the invention is the same as that of the preferred form. The difference between the same is in the structure and arrangement of the bolts and arcuate slots in which the bolts slide.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a tine assembly for use on a powered rotating shaft of a tiller, the shaft being rotatable in a forward rotating direction and alternately in a rearward rotating direction, comprising in combination a plate mounted on said shaft for rotation with the shaft, said plate being adapted to carry and revolve a plurality of tiller tines connected to the plate at spaced locations around the peripheral extent of the plate, each of said tines having a soil working outer end portion, a pivot connection pivotally connecting said plate and each said tine, respectively to permit the said soil working end portion of the tine to swing in an arc radially outward of the plate, and limiting means for limiting the extent of the swinging movement of each said tine in its respective arc, said limiting means comprising a pin and an arcuate slot in which the pin is accommodated and movable between the terminal walls of the slot, one of said pin and said slot in which the pin is accommodated being carried by the said plate and the other of said pin and said slot being carried by the respective tine.

2. The combination as claimed in claim 1 and in which each said pin is carried by said plate adjacent the associated tine and the arcuate slot in which the pin is accommodated is carried by the respective tine.

3. The combination as claimed in claim 1 and in which each said pin is carried by a respective tine and the arcuate slot in which the pin is accommodated is carried by the said plate adjacent the associated tine.

4. The combination as claimed in claim 1 and including frictional drag means associated with each said pin and plate for retarding the free swinging of each said pin in the slot.

5. The combination as claimed in claim 1 and in which the soil working outer end portion of each said tine is beveled along opposite edges to provide for the tine readily cutting into the soil by one of said beveled edges in each of the forward and rearward rotative movements of said shaft and plate.

6. In a tine assembly for use on a powered rotating shaft of a tiller, the shaft being selectively rotatable in a forward rotative direction and alternately in a rearward rotative direction, the tine assembly including a plate mounted on the shaft for rotation with the shaft and a plurality of tines carried by the plate at spaced locations around the peripheral extent of the plate and extending from the plate in soil working positions, the improved mounting of each said tine to the plate, said mounting comprising a pivot connection between the said tine and the plate to permit the tine to swing outwardly of the plate into said soil working positions, and a pin in an arcuate-slot interconnection between the said tine and the plate to limit swinging movement of the tine, one of the pin and slot of this said interconnection being carried by the plate and the other of the pin and slot of the said interconnection being carried by the tine, said slot transversing a reference line extending radially from the axis of said shaft and plate through the axis of said pivot connection line to permit the tine to swing on one side of the said reference line upon the shaft and plate rotating in one rotative direction, and to permit the tine to swing on the other side of said reference line upon the shaft and plate rotating in an opposite rotative direction.

7. The combination claimed in claim 6 and in which the slot of said interconnection is carried by the plate and the pin of said interconnection is carried by the tine.

8. The combination claimed in claim 6 and in which the slot of said interconnection is carried by the tine and the pin of the said interconnection is carried by the plate.

9. The combination claimed in claim 6 and in which the tine has a soil working end portion extending outwardly from the plate to till the soil upon rotation of this assembly of plate and tines, the soil working end portion having beveled opposite edges to position one of the said edges to cut into the soil upon rotation of the assembly in a forward rotative direction and to position the other of said edges to cut into the soil upon rotation of the assembly in a rearward rotative direction.

10. The combination claimed in Claim 6 and in which said pivot connection is located on said reference line and radially outward of said pin and slot interconnection.

11. In a tine assembly for use on a powered rotating shaft of a tiller, the shaft being rotatable in a forward rotating direction and alternately in a rearward rotating direction, comprising in combination a plate mounted on said shaft for rotation with the shaft, said plate being adapted to carry and revolve a plurality of tiller tines connected to the plate at spaced locations around the peripheral extent of the plate, each of said tines having a soil working outer end portion, a pivot connection pivotally connecting said plate and each said tine, respectively, to permit the said soil working end portion of the tine to swing in an arc radially outward of the plate substantially 15 degrees about said pivot connection between positions one of which presents a leading cutting edge angle for forward tine rotation and one of which presents a second leading cutting edge angle for reverse tine rotation, and limiting means for automatically limiting the extent of the swinging movement of each said tine in its respective arc, said limiting means comprising a pin and an arcuate slot in which the pin is accommodated and movable between the terminal walls of the slot, one of said pin and said slot in which the pin is accommodate being carried by the said plate and the other of said pin and said slot being carried by the respective tine.

12. The tine assembly of claim 11 characterized by the addition of a frictional drag means exerting a force on said tines substantially parallel to the axis of said pivot connection for preventing unrestrained swinging of the tines about said pivot connection.

13. The tine assembly of claim 12 characterized in that said frictional drag means comprises bellows washers, and said bellows washers being connected between the pin of said limiting means and said plate of the respective tine.

14. In a tine assembly for use on a powered rotating shaft of a tiller, the shaft being rotatable in a forward rotating direction and alternately in a rearward rotating direction, comprising in combination a plate mounted on said shaft for rotation with the shaft, said plate being adapted to carry and revolve a plurality of tiller tines connected to the plate at spaced locations around the peripheral extent of the plate, each of said tines having a soil working outer end portion, a pivot connection pivotally connecting said plate and each said tine, respectively, to permit the said soil working end portion of the tine to swing in an arc radially outward of the plate, said pivot connection having an axis, frictional drag means exerting a force substantially parallel to the axis of said pivot connection for preventing unrestrained swinging of the tines about said pivot connection, and limiting means for limiting the extent of the swinging movement of each said tine in its respective arc, said limiting means comprising a pin and an arcuate slot in which the pin is accommodated and movable between the terminal walls of the slot, one of said pin and said slot in which the pin is accommodated being carried by the said plate and the other of said pin and said slot being carried by the respective tine.

15. The tine assembly of claim 14 characterized in that said frictional drag means comprises bellows washers, and said bellows washers being connected between the pin of said limiting means and said plate of the respective tine.

16. The tine assembly of claim 14 characterized in that said limiting means limits the motion of the tines in response to the direction of rotation of said plate.

* * * * *